US010911478B2

(12) United States Patent
Patrich et al.

(10) Patent No.: US 10,911,478 B2
(45) Date of Patent: Feb. 2, 2021

(54) DETECTION OF ATTACKS IN THE CLOUD BY CROWD SOURCING SECURITY SOLUTIONS

(71) Applicant: MICROSOFT TECHNOLOGY LICENSING, LLC, Redmond, WA (US)

(72) Inventors: Dotan Patrich, Rishon Lezion (IL); Vlad Korsunsky, Modi'in (IL); Maya Maimon, Giv'at Shmuel (IL); Moshe Israel, Ramat-Gan (IL); Oran Brill, Modi'in-Maccabim-Re'ut (IL); Tomer Teller, Tel-Aviv (IL)

(73) Assignee: MICROSOFT TECHNOLOGY LICENSING, LLC, Redmond, UT (US)

( * ) Notice: Subject to any disclaimer, the term of this patent is extended or adjusted under 35 U.S.C. 154(b) by 521 days.

(21) Appl. No.: 15/637,515

(22) Filed: Jun. 29, 2017

(65) Prior Publication Data

US 2019/0005225 A1  Jan. 3, 2019

(51) Int. Cl.
*H04L 29/06* (2006.01)
*G06F 21/55* (2013.01)
(Continued)

(52) U.S. Cl.
CPC ........ *H04L 63/1441* (2013.01); *G06F 21/316* (2013.01); *G06F 21/554* (2013.01);
(Continued)

(58) Field of Classification Search
CPC . H04L 63/14; H04L 63/1416; H04L 63/1433; H04L 63/1441; H04L 63/0421;
(Continued)

(56) References Cited

U.S. PATENT DOCUMENTS 8,904,531 B1  12/2014  Saklikar et al.
9,223,978 B2  12/2015  Kraemer
(Continued)

FOREIGN PATENT DOCUMENTS

AU  2016202184 B1  9/2016

OTHER PUBLICATIONS

"ThreatRadar: Web Application Threat Intelligence", https://www.imperva.com/Products/ThreatRadarSubscriptions, Retrieved on: May 22, 2017, 9 pages.
(Continued)

*Primary Examiner* — Zachary A. Davis
(74) *Attorney, Agent, or Firm* — Workman Nydegger

(57) ABSTRACT

Methods are provided for building and tuning a correlation data structure. The correlation data structure includes relationship correlations with relationship scores that reflect the level of correlation between alert conditions and feature set events that occurred in a machine. Each relationship correlation further includes a time of influence associated with the times of occurrence for each alert condition and corresponding feature set event. The correlation data structure is built and tuned using sourcing to leverage the alert conditions and feature set events on each machine for all machines in the network. Methods are also provided to use the correlation data structure to monitor the machines in a network, detect feature set events, and detect if alert conditions correlated with those feature set events are likely to occur. The methods further provide for mitigating those alert conditions.

11 Claims, 9 Drawing Sheets

(51) Int. Cl.
*H04L 12/26* (2006.01)
*G06F 21/57* (2013.01)
*G06F 21/62* (2013.01)
*G06F 21/31* (2013.01)

(52) U.S. Cl.
CPC ........ *G06F 21/577* (2013.01); *G06F 21/6254* (2013.01); *H04L 43/0817* (2013.01); *H04L 63/1416* (2013.01); *H04L 63/1433* (2013.01)

(58) Field of Classification Search
CPC ........ G06F 21/55; G06F 21/554; G06F 21/57; G06F 21/577; G06F 21/6245; G06F 21/6254
See application file for complete search history.

(56) References Cited

U.S. PATENT DOCUMENTS

| | | | |
|---|---|---|---|
| 9,531,745 | B1 | 12/2016 | Sharma et al. |
| 9,551,781 | B2 * | 1/2017 | Baxley ................. G06F 16/285 |
| 9,654,485 | B1 * | 5/2017 | Neumann ........... H04L 63/1416 |
| 10,116,676 | B2 * | 10/2018 | Roosenraad ........ G06F 16/9535 |
| 10,366,229 | B2 * | 7/2019 | Martin ................ H04L 63/1425 |
| 2012/0137367 | A1 * | 5/2012 | Dupont .................. G06F 21/00 726/25 |
| 2016/0255115 | A1 | 9/2016 | Mital et al. |
| 2017/0054754 | A1 | 2/2017 | Saher et al. |
| 2017/0093907 | A1 | 3/2017 | Srivastava |
| 2017/0171231 | A1 | 6/2017 | Reybok et al. |

OTHER PUBLICATIONS

Zimmermann, Gil, "The Buyer's Guide to Cloud Access Security Brokers (CASBs)", https://static.ziftsolutions.com/files/ff8081815a29e70c015a4747c5d9771f/Cisco%20Cloudlock%20Buyers%20Guide%20CASBs.pdf, Retrieved on May 22, 2017, pp. 1-34.

"Qualys and Bugcrowd Bring the Power of Automation and Crowdsourcing to Web Application Security", https://bugcrowd.com/resources/bugcrowd-qualys-integration, Published on: Feb. 13, 2017, 4 pages.

Richmond, et al., "CrowdStrike: Combining Threat Intelligence and SaaS Endpoint Protection", https://www.crowdstrike.com/wp-content/brochures/IDC_Vendor_Profile-CrowdStrike.pdf, Published on Nov. 2016, pp. 1-9.

"Partner Security Offerings", https://www.rackspace.com/en-in/security/partner-security-offerings, Retrieved on May 22, 2017, 13 pages.

"International Search Report and Written Opinion Issued in PCT Application No. PCT/US2018/035242", dated Dec. 6, 2018, 25 Pages.

Stroeh,, et al., "An Approach to the Correlation of Security Events based on Machine Learning Techniques", In Journal of Internet Services and Applications, vol. 4, Issue 7, Mar. 11, 2013, 16 pages.

* cited by examiner

DETECTION OF ATTACKS IN THE CLOUD BY CROWD SOURCING SECURITY SOLUTIONS

BACKGROUND

Computers and computing systems have affected nearly every aspect of modern living. For instance, computers are generally involved in work, recreation, healthcare, transportation, entertainment, household management, etc.

Computing system functionality can be enhanced by a computing system's ability to be interconnected to other computing systems via network connections. Network connections may include, but are not limited to, connections via wired or wireless Ethernet, cellular connections, or even computer to computer connections through serial, parallel, USB, or other connections. The connections allow a computing system to access services at other computing systems and to quickly and efficiently receive application data from other computing systems.

Interconnection of computing systems has facilitated distributed computing systems, such as so-called "cloud" computing systems. In this description, "cloud computing" may be systems or resources for enabling ubiquitous, convenient, on-demand network access to a shared pool of configurable computing resources (e.g., networks, servers, storage, applications, services, etc.) that can be provisioned and released with reduced management effort or service provider interaction. A cloud model can be composed of various characteristics (e.g., on-demand self-service, broad network access, resource pooling, rapid elasticity, measured service, etc.), service models (e.g., Software as a Service ("SaaS"), Platform as a Service ("PaaS"), Infrastructure as a Service ("IaaS"), and deployment models (e.g., private cloud, community cloud, public cloud, hybrid cloud, etc.).

Cloud and remote based service applications are prevalent. Such applications are hosted on public and private remote systems such as clouds and usually offer a set of web based services for communicating back and forth with clients.

One of the challenges companies and organizations face when considering migration from on-premises servers to cloud computing is dealing with the new threat landscape that the cloud exposure brings. As cloud deployments and resources are more directly exposed to the Internet by definition, they are faced with constant and wide spread security attacks which otherwise would have been less possible in an on premise network. To help companies and organizations overcome these challenges, cloud providers invest heavily in securing the cloud infrastructure and provide customers with additional security solutions that can be installed on virtual machines or applied to managed cloud services.

Another aspect of this problem is how companies and organizations protect their cloud resources and which security solutions to put in place. Some customers have internal security organizations that can setup security solution and provide with guidelines, while others may lack such an internal security organization and will resort to installing some security solutions or none at all. As with every case in the security detection domain, getting good coverage for detection is very hard to achieve in these scenarios.

Further, security information teams face challenges to effectively triage and handle alerts detected by various security products, while reasonably allocating security staff to that task. As security information teams in most organizations receive more alerts than they can handle, the task of effectively triaging alerts and investigating alerts can fall to non-experts, reducing effectiveness of the security information teams. Thus, managing the security information teams is also a critical aspect of security operating procedure.

Due to the ever-changing threats of viruses, malware, and other malicious software, security protection must be constantly updated. Due to different needs, some users in a cloud network may be constantly on the cutting edge of security systems. Cost or application differences may result in other users providing lesser security systems or being less diligent in updating or monitoring their systems.

For many users, the cost impact of updating security makes providing good security difficult. Some users have simply chosen to go without security in the cloud. In shared networks, this can in some instances create risks for other users who have no insight or purview into the security systems of others. Additionally, users who have detected or resolved security issues have critical security information, but this information is generally not utilized to the benefit of other users, even when on the same cloud network.

Some companies have developed proprietary products for automated security incident response, which use a set of predefined rules to gather relevant supporting evidence for each kind of alert that is detected. However, such systems are fairly limited in the number of alerts they detect and can handle. This can also lead to poor quality in the information gathered as supporting evidence for each alert, as it cannot be tightly correlated with each alert. In addition, some data pieces which are relevant only for specific alerts, might not be looked into when the process is a generic one that is being applied to every alert.

Many existing products are also limited in their ability to correlate time references associated with alerts. For instance, in some cases, an attack might start only a few seconds after an alert condition. In other cases it might take days before an attack is activated from an initial alert condition. However, it can be difficult to identify the time frame before an attack will occur or even an alert condition associated with the attack when the data that is being gathered is limited to only a single enterprise.

For at least these reasons, there is an ongoing need for improved security systems that are capable of helping to identify alert conditions associated with imminent attacks and the time frames associated with the attacks.

However, that said, the subject matter claimed herein is not limited to embodiments that solve any disadvantages or that operate only in environments such as those described above. Rather, this background is only provided to illustrate one exemplary technology area where some embodiments described herein may be practiced.

BRIEF SUMMARY

Disclosed embodiments include systems and methods that can be used for processing security alert data that is associated with a plurality of tenants and in order to help detect and mitigate alert conditions. In particular, disclosed embodiments include systems and methods that can be used for building, tuning and applying correlation data structures that define correlations between detected signal patterns and security alerts and which can be used in order to help detect and mitigate the detection of alert conditions. For instance, in some embodiments, a pattern of signals that corresponds with a security alert is detected and used to predict when a corresponding attack might occur. Such embodiments can be used to help trigger preventative measures against the impending/predicted attack.

One embodiment illustrated herein includes a computer-implemented method for generating a correlation data structure associated with a plurality of machines (e.g., cloud machines and/or on-premise machines). The method starts by reading signals associated with a plurality of machines in a network. The method further includes creating machine state snapshots from the signals, including state data from the machines. Feature sets, which are created from each of the machine state snapshots, include feature set events identified by the state data.

Next, a correlation data structure is generated using data from the feature sets. The correlation data structure includes relationship correlations that reflect relationships between the feature set events from the feature sets and corresponding alert types. Each relationship correlation also includes a time of influence identifier that reflects a time that is associated with or between the occurrences of each correlating feature set event and alert type. Each relationship correlation also includes a relationship score that reflects a relative value of correlation between the feature set event, corresponding alert type, and time of influence. The correlation data structure is then stored.

Another aspect or embodiment includes a computer-implemented method for tuning the relationship correlations in the correlation data structure. The method includes detecting alert conditions in a cloud machine at a particular time. The method also includes detecting feature set events from the machine state snapshots. Each feature set event will have an associated time of influence corresponding to the time between the occurrence of the feature set event and the detected alert condition.

The method further includes accessing the correlation data structure and identifying a match between the gathered data and data existing in the correlation data structure. For instance, the method will include looking for a match between the signal pattern and the correlating alert condition, feature set event, and associated time of influence in the correlation data structure. In such embodiments, the detected signal pattern will also include an alert condition, detected feature set event, and associated time of influence.

Upon finding the first match, the method further includes modifying the relationship score of the matched relationship correlation in the correlation data structure to reflect an increased or decreased cumulative correlation based on how closely the signal pattern matches the stored relationship correlation.

Another aspect or embodiment is a computer-implemented method for managing the correlation data structure to detect and mitigate attacks on a machine. The method includes monitoring each machine in a network and detecting a feature set event in a feature set from the machine state snapshots. The method further includes accessing the correlation data structure and identifying a relationship correlation, corresponding to the detected feature set event. For each combination of the detected feature set event with the alert conditions and associated times of influence correlated with the detected feature set event, the method accesses the relationship score and determines whether the relationship score meets or exceeds a predetermined threshold score.

The method also includes, upon determining the relationship score meets or exceeds the predetermined threshold score, taking one or more actions to mitigate the alert condition correlated with the detected feature set event.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

Additional features and advantages will be set forth in the description which follows, and in part will be obvious from the description, or may be learned by the practice of the teachings herein. Features and advantages of the invention may be realized and obtained by means of the instruments and combinations particularly pointed out in the appended claims. Features of the present invention will become more fully apparent from the following description and appended claims, or may be learned by the practice of the invention as set forth hereinafter.

BRIEF DESCRIPTION OF THE DRAWINGS

In order to describe the manner in which the above-recited and other advantages and features can be obtained, a more particular description of the subject matter briefly described above will be rendered by reference to specific embodiments which are illustrated in the appended drawings. Understanding that these drawings depict only typical embodiments and are not therefore to be considered to be limiting in scope, embodiments will be described and explained with additional specificity and detail through the use of the accompanying drawings in which.

DETAILED DESCRIPTION

Figure 1:
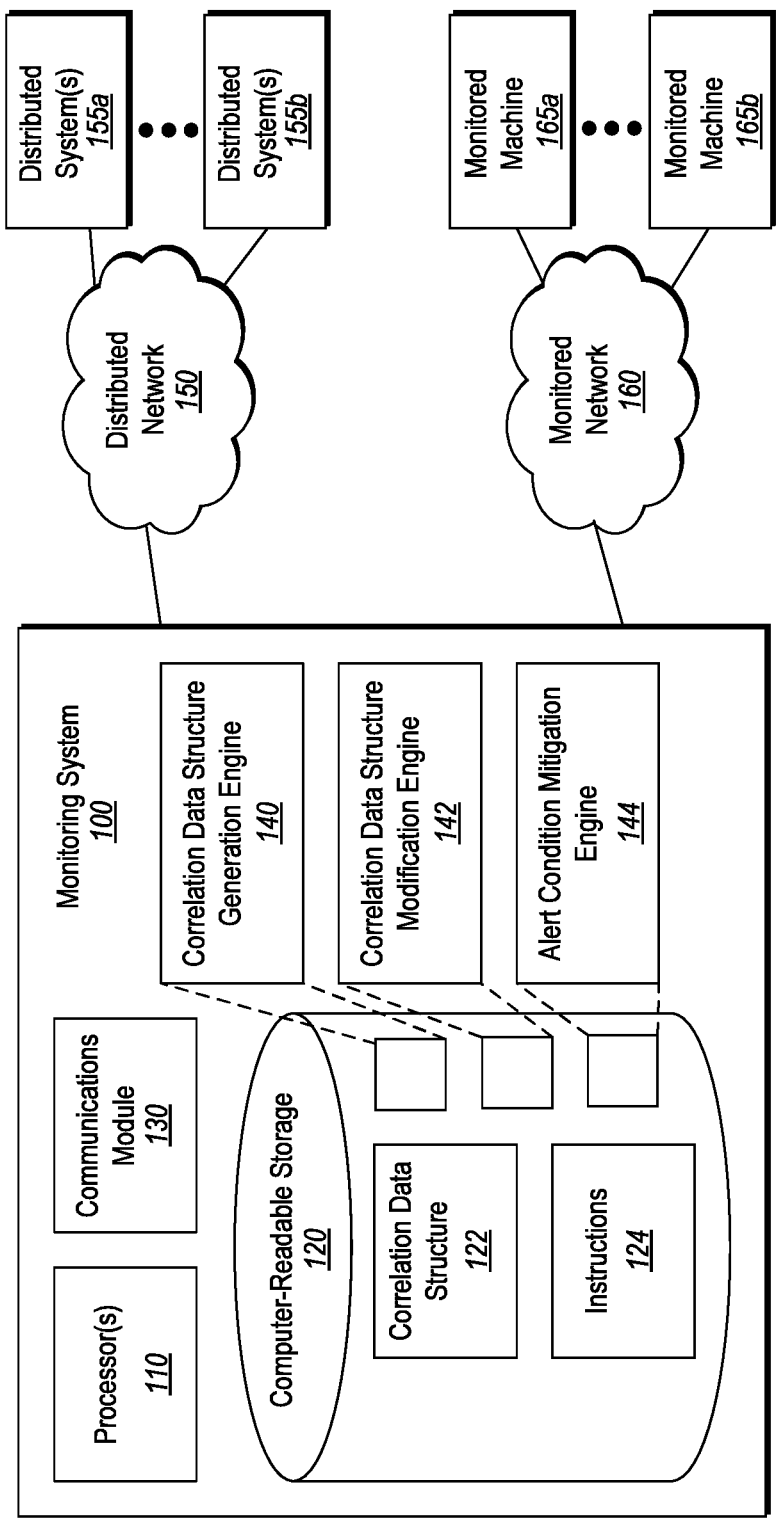
FIG. 1 illustrates a block diagram of an embodiment of a monitoring system.

Disclosed embodiments include systems and methods that can be used for building, tuning and applying correlation data structures that define correlations between signal patterns and security alerts and which can be used in order to help detect and mitigate alert conditions.

In some embodiments, a pattern of signals are detected that correspond with security alerts preceding security attacks, and the signals are used to predict when an attack might occur and can be used to help take preventative measures against the attack. For instance, when a security alert pattern is detected, it can be deduced that a possible attack is underway, even when no concrete security alert is in existence (possibly due to lack of on-premise security solutions that would have generated such an alert). This approach can improve the security protection provided by cloud services and share the signals detected prior to an alert from different security solution to bridge the detection coverage gaps between different security solutions.

In some instances, the correlation data structures that are used to detect and track security alerts are built and tuned using crowd sourcing techniques. In addition, the correlation data structures can be utilized by a cloud and/or hybrid-cloud/premise service/provider to improve the security of individual tenants that do not have any on-premise security solution in place.

Use of the disclosed embodiments can help enable users to crowd source their security efforts, increasing the security for all users, without incurring the same costs or manpower issues presented by existing solutions. The disclosed embodiments can also be used to help users detect and prevent malicious attacks more effectively by pooling collective crowd-sourced signals and experiences.

The following discussion will refer to a number of systems, methods, and method acts that may be performed. Although the method acts may be discussed in a certain order or illustrated in a flow chart as occurring in a particular order, no particular ordering is required unless specifically stated, or required because an act is dependent on another act being completed prior to the act being performed.

Further, the methods may be practiced by a computer system including one or more processors and computer-readable media such as computer memory. In particular, the computer memory may store computer-executable instructions that when executed by one or more processors cause various functions to be performed, such as the acts recited in the embodiments.

Embodiments of the present invention may comprise or utilize a special purpose or general-purpose computer including computer hardware, as discussed in greater detail below. Embodiments within the scope of the present invention also include physical and other computer-readable media for carrying or storing computer-executable instructions and/or data structures. Such computer-readable media can be any available media that can be accessed by a general purpose or special purpose computer system. Computer-readable media that store computer-executable instructions are physical storage media. Computer-readable media that carry computer-executable instructions are transmission media. Thus, by way of example, and not limitation, embodiments of the invention can comprise at least two distinctly different kinds of computer-readable media: physical computer-readable storage media and transmission computer-readable media.

Physical computer-readable storage media includes RAM, ROM, EEPROM, CD-ROM or other optical disk storage (such as CDs, DVDs, etc.), magnetic disk storage or other magnetic storage devices, or any other medium which can be used to store desired program code means in the form of computer-executable instructions or data structures and which can be accessed by a general purpose or special purpose computer.

A "network" is defined as one or more data links that enable the transport of electronic data between computer systems and/or modules and/or other electronic devices. When information is transferred or provided over a network or another communications connection (either hardwired, wireless, or a combination of hardwired or wireless) to a computer, the computer properly views the connection as a transmission medium. Transmissions media can include a network and/or data links which can be used to carry or desired program code means in the form of computer-executable instructions or data structures and which can be accessed by a general purpose or special purpose computer. Combinations of the above are also included within the scope of computer-readable media.

Further, upon reaching various computer system components, program code means in the form of computer-executable instructions or data structures can be transferred automatically from transmission computer-readable media to physical computer-readable storage media (or vice versa). For example, computer-executable instructions or data structures received over a network or data link can be buffered in RAM within a network interface module (e.g., a "NIC"), and then eventually transferred to computer system RAM and/or to less volatile computer-readable physical storage media at a computer system. Thus, computer-readable physical storage media can be included in computer system components that also (or even primarily) utilize transmission media.

Computer-executable instructions comprise, for example, instructions and data which cause a general purpose computer, special purpose computer, or special purpose processing device to perform a certain function or group of functions. The computer-executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the invention may be practiced in network computing environments with many types of computer system configurations, including personal computers, desktop computers, laptop computers, message processors, hand-held devices, multi-processor systems, microprocessor-based or programmable consumer electronics, network PCs, minicomputers, mainframe computers, mobile telephones, PDAs, pagers, routers, switches, and the like. The invention may also be practiced in distributed system environments where local and remote computer systems, which are linked (either by hardwired data links, wireless data links, or by a combination of hardwired and wireless data links) through a network, both perform tasks. In a distributed system environment, program modules may be located in both local and remote memory storage devices.

Alternatively, or in addition, the functionality described herein can be performed, at least in part, by one or more hardware logic components. For example, and without limitation, illustrative types of hardware logic components that can be used include Field-programmable Gate Arrays (FPGAs), Application-specific Integrated Circuits (ASICs), Application-specific Standard Products (ASSPs), System-on-a-chip systems (SOCs), Complex Programmable Logic Devices (CPLDs), etc.

Referring now to FIG. 1, a block diagram of an embodiment of a monitoring system 100 is illustrated. The monitoring system 100 is in communication with a monitored network 160 including monitored machines 165a and 165b. This communication is accomplished by communications module 130, which is configured to provide communication between monitored network 160, distributed network 150, or similar devices, machines, systems, or networks that need to communicate with monitoring system 100.

The monitoring system 100 is configured to monitor the monitored machines 165a and 165b for alert conditions resulting from attacks on the monitored machines 165a and 165b. This is accomplished in part with a correlation data structure 122, which will be built, tuned and applied in different ways (as described herein).

As shown, the monitoring system 100 includes a correlation data structure generation engine 140 for generating one or more correlation data structures 122. In at least one embodiment, the correlation data structure 122 is generated based on monitored data from the monitored machines 165a and 165b. In other embodiments, the correlation data structure 122 is generated by setting the correlation data structure 122 to a predetermined set of values. In yet other embodiments, the correlation data structure 122 is generated based on empirical data.

The monitoring system 100 also includes a correlation data structure modification engine 142 for tuning the correlation data structure 122. The correlation data structure modification engine 142 uses monitored data from the monitored machines 165a, and 165b to tune the correlation data structure 122.

The monitoring system 100 further includes an alert condition mitigation engine 144 for detecting and mitigating threats to the monitored cloud machines 165a and 165b. The alert condition mitigation engine 144 applies the correlation data structure 122 in such a way as to help detect alert conditions and to trigger mitigating action(s).

The monitoring system 100 also includes one or more processors 110 and computer-readable storage 120. The computer-readable storage 120 is used to store the correlation data structure 122 and instructions 124. The instructions 124 are computer-executable instructions that when executed by the processors 110 cause the various functions of the monitoring system 100 to be performed. In some embodiments, this includes operating the correlation data structure generation engine 140, the correlation data structure modification engine 142, and the alert condition mitigation engine 144, to build, tune and/or apply one or more correlation data structure(s). While only a single correlation data structure 122 is presently shown, the system may actually build, tune, store and/or apply various different correlation data structures, as will be described below (in reference to FIG. 7).

In some embodiments, the correlation data structure generation engine 140, the correlation data structure modification engine 142, and the alert condition mitigation engine 144 are instantiated (at least partially, or entirely) by computer-executable instructions (such as instructions 124) that can be executed by the processor(s) 110.

In some embodiments, the correlation data structure generation engine 140, the correlation data structure modification engine 142, and the alert condition mitigation engine 144 are implemented (at least partially, or entirely) in hardware on specialized processors, digital signal processors (DSP), full-programmable gate arrays (FPGA), or other hardware configured to provide the required functionality.

Monitoring system 100 is connected to distributed network 150 with distributed systems 155a and 155b. These distributed systems 155a and 155b can be cloud systems/resources or on-premise monitored systems. In some embodiments, the various functions and elements depicted in monitoring system 100 are distributed between monitoring system 100 and distributed systems 155a and 155b. For example, in one embodiment, monitoring system 100 provides the point of contact for monitoring monitored network 160 (which can be a cloud network), while distributed systems 155a and 155b each contain at least a portion of the correlation data structure generation engine 140, correlation data structure generation engine 142 and/or the computer-readable storage 120.

Figure 2A:
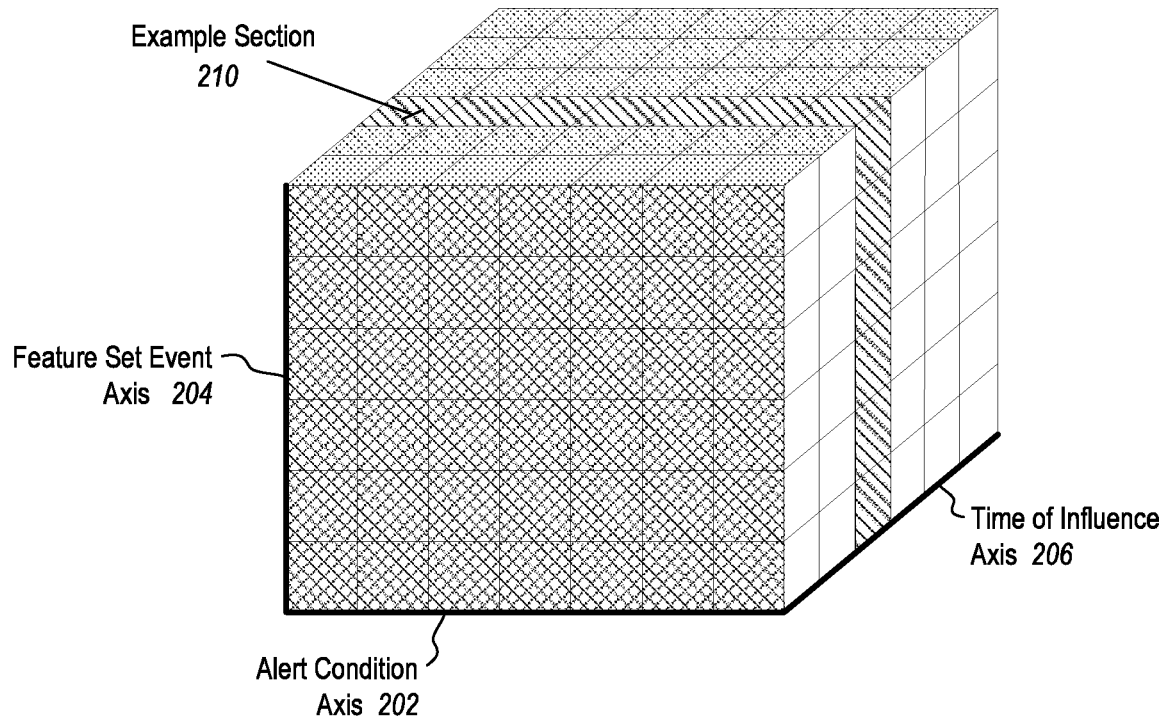
FIGS. 2*a*-2*b* illustrate an example embodiment of the correlation data structure.

Attention will now be directed to FIG. 2a, which illustrates one non-limiting example of the correlation data structure 122. As shown, the correlation data structure 122 contains relationship correlations reflecting the relationship or correlation between feature set events, alert conditions, and associated times of influence between the occurrence of each feature set event and alert condition. The relationship correlations describe the level of correlation of a given feature set event, alert condition, and associated time of influence occurring in monitored cloud machines 165a and 165b.

In the depicted embodiment, the correlation data structure 122 is represented as a three-dimensional matrix with an alert condition axis 202, feature set event axis 204, and time of influence axis 206. This three-dimensional matrix is visually depicted as a cube made of smaller cubes, each smaller cube representing an element of the matrix. As such, each element of the matrix represents a combination or pattern of a specific alert condition, feature set event, and time of influence. If a single one of these values is fixed, for example, a time of influence, a slice may be taken from the correlation data structure representing a two-dimensional matrix with one axis as the feature set event axis 204 and the other being the alert condition axis 202. A slice or section is taken for a fixed time of influence, resulting in the cross-hatch marked example section 210.

Figure 2B:
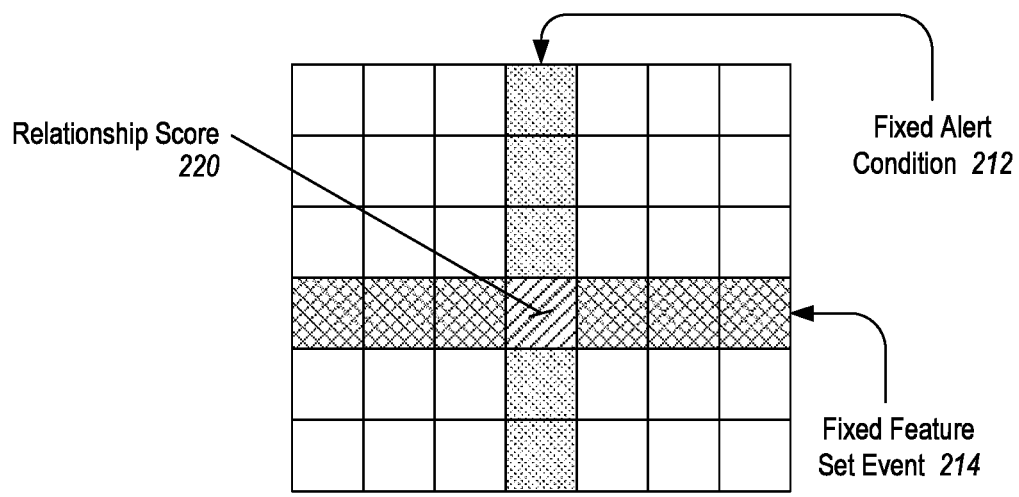

FIG. 2b illustrates a two-dimensional matrix represented by an example section 210 taken from the correlation data structure 122. Each element of this example section 210 represents a relationship correlation. Accordingly, if the alert condition is determined, a single row of elements, represented as fixed alert condition 212, may be identified. If the feature set event is determined, a single row represented as fixed feature set event 214 may likewise be identified. If both the feature set event and alert condition are determined, a single element of the matrix can be identified representing the relationship correlation for the combination or pattern of the determined or fixed feature set event, alert condition, and time of influence.

In some embodiments, the determined relationship correlation is associated with a relationship score 220 that numerically describes the level of correlation of the combination or pattern (intersecting alert condition and feature set event). In some embodiments, a higher correlation between an alert condition, a feature set event, and an associated time of influence is indicated by a higher relationship score 220.

In some embodiments, the relationship score 220 is an integer value that can be incremented or decremented to express increased or decreased correlation. In other embodiments, the relationship score 220 is a number that may be incremented, decremented, or otherwise scaled to express increased or decreased correlation. Those skilled in the art will recognize that different choices for representing the relationship score 220 advantageously provide decreased storage requirements, improved access times, or other system improvements.

More generally, the correlation data structure 122 is any data structure capable of representing relationship correlations and relationship scores 220 as related to the corresponding combination or pattern of feature set event, alert condition, and associated time of influence. Accordingly, while the embodiment presented above describes the correlation data as a matrix, it will be appreciated that the embodiments of this disclosure may include any type of suitable data structure that is operable/configured to store the relevant feature set event data, alert condition data, time of influence data and relationship score data. Such data structures may include databases, pivot tables, relational tables, or other data structures capable of expressing the correlation relationships described herein.

Figure 3:
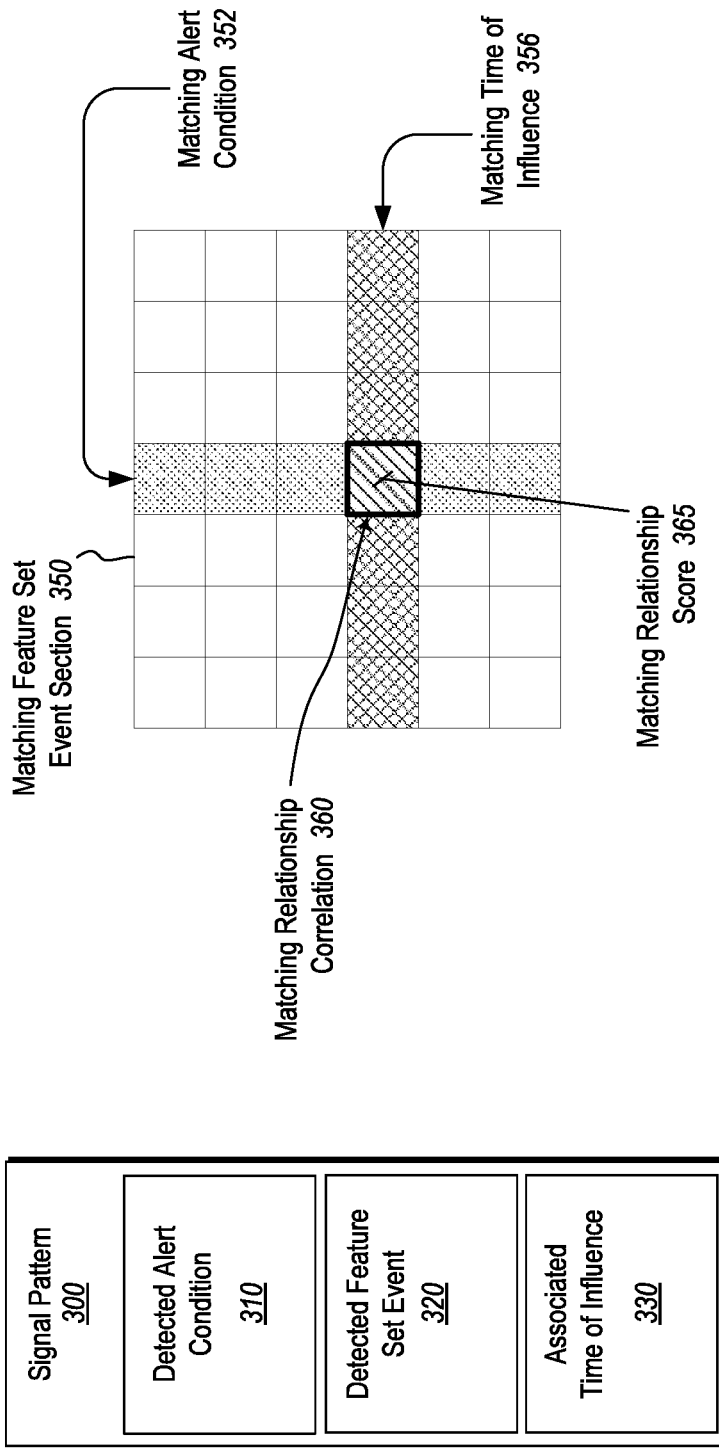
FIG. 3 illustrates an alert condition, feature set event, and time of influence pattern for comparison to the relationship correlations in the correlation data structure.

FIG. 3 illustrates an example of how a correlation data structure can be used to find a matching relationship correlation 360 with a detected signal pattern 300. For instance, as described herein, the signal pattern 300 may include or define a detected alert condition 310, a detected feature set event 320, and an associated time of influence 330. In some embodiments, a detected alert condition 310 or detected feature set event 320 may be detected during monitoring of one or more monitored machines 165a and 165b. In other embodiments, the detected alert condition 310 or detected feature set event 320 may be detected by matching part of a signal pattern 300 with relationship correlations in the correlation data structure 122.

The corresponding matching elements from the correlation data structure are visually expressed in FIG. 3 as matching feature set event section 350. Similar to example section 210 in FIG. 2b, the matching feature set event section 350 is a section or slice cut out of the correlation data structure 122 or another correlation data structure, with a matching time of influence 356 and a matching alert condition 352.

In this instance, signal pattern 300 has a detected alert condition 310, detected feature set event 320, and associated time of influence 330 matching the relationship correlation 360. Presently, the matching relationship correlation 360 has a matching relationship score 365. When building/tuning the correlation data structure, this occurrence (detecting a match from a new signal from a same or different system) may trigger the increase of the matching relationship score 365.

In other embodiments, detecting the match from the signal pattern may trigger a mitigating action. For instance, in some embodiments, the relationship scores in the relationship correlations are compared to a threshold score. Each relationship score that meets or exceeds the threshold score is a matching relationship score 365 and the corresponding matching relationship correlation 360 identifies the matching feature set event and time of influence. These are detected or identified in the correlation data structure 122 and become the detected alert condition 310 and associated time of influence 330 in the signal pattern 300. In some embodiments this signal pattern 300 is used to identify the potential consequences of detected feature set events 320 so that the monitoring system 100 may take actions to mitigate the detected alert condition 310.

In yet other embodiments, the signal patterns 300 and corresponding data are used to initially train or generate the correlation data structure(s) with matching relationship correlations 360 and matching relationship scores 365.

Figure 4:
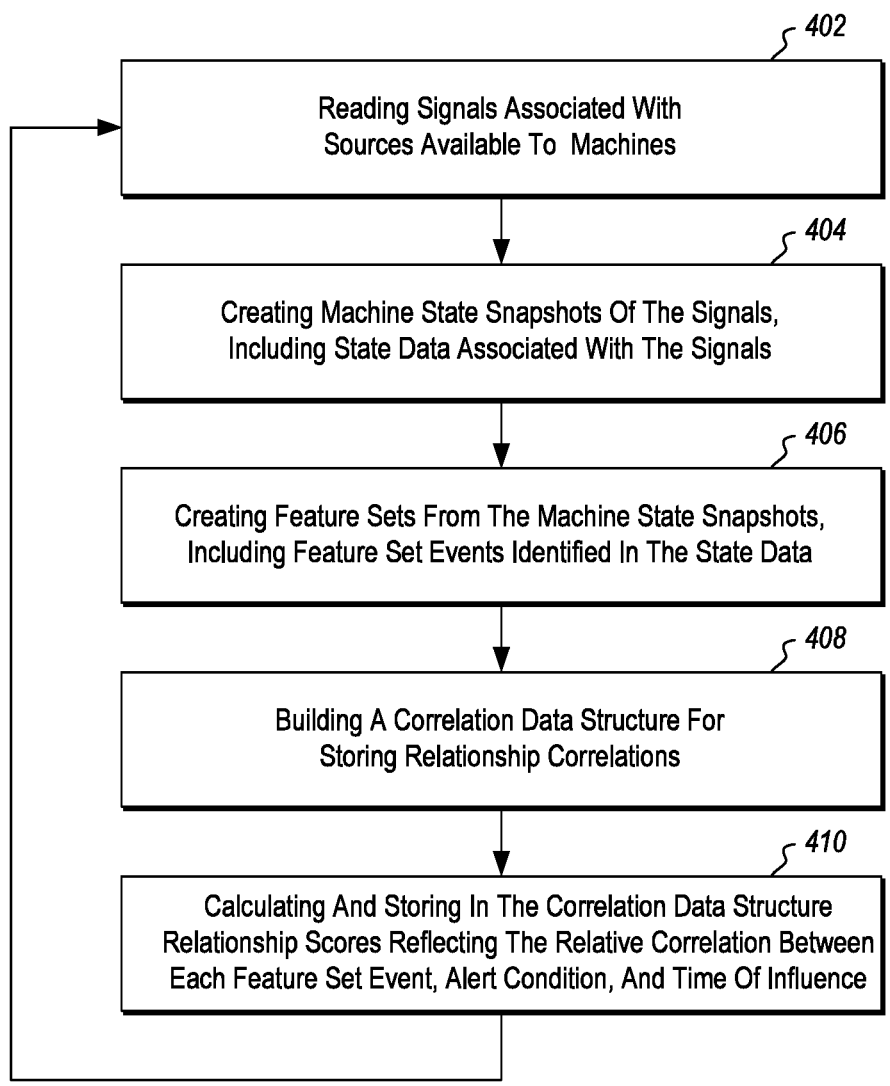
FIG. 4 illustrates a method for generating a correlation data structure.

Attention will now be directed to FIG. 4, which illustrates a flow chart for a method for generating a correlation data structure 400. In some embodiments, this method describes how the correlation data structure generator engine 140 generates or creates a correlation data structure 122. As shown, the first illustrated act is an act for reading signals associated with sources available to machines (act 402).

The monitored machines 165a and 165b have sources that generate signals. Some of these signals identify, indicate, or otherwise correspond to feature set events. Signals include, for example, registry modifications, service registrations, process creation, scheduled tasks, file access events, user login events, user account creation and user deletion. The signals are read into the monitoring system 100 and the correlation data structure generator engine 140.

Next, the correlation data structure generator engine 140 creates machine state snapshots of the signals (act 404). These machine state snapshots include state data associated with the signals. Each machine state snapshot is captured at a moment in time, reflecting state data at that time. For example, if the signal is registry modification, a machine state snapshot created for a given time could indicate how many registry modifications had taken place since the last machine state snapshot or some previous time. Alternatively, the machine state snapshot could show the state of the registry itself so that registry modifications could be inferred by changes between machine state snapshots at different times.

In some embodiments, machine state snapshots are taken at periodic fixed intervals. In some embodiments, these periodic fixed intervals are 12 hours, 1 day, 2 days, or 1 week. In other embodiments, these periodic fixed intervals are a repeating list of a combination of different times. For example, the periodic fixed intervals may be a list of time periods including 1 hour, 2 hours, 4 hours, and 6 hours. Each successive machine state snapshot is taken at the next time period in the list. After reaching the last time period, the list is repeated in a periodic fashion.

In some embodiments, the machine state snapshots are batched and processed as a group. In some embodiments, batching includes taking all the signals read by the correlation data structure generator engine for a time period and batching the signals into a machine state snapshot to be processed. In some embodiments, batching includes taking multiple machine state snapshots and processing the batch as a group.

In some embodiments, a user of a monitored machine 165a or 165b can choose to block signals being read from the monitored machine 165a or 165b such that the blocked signals are not included in the machine state snapshot. For example, the machine state snapshot excludes a particular signal selectively identified by a monitored machine 165a or 165b to not be included in the machine state snapshot.

Next, the correlation data structure generator engine 140 creates feature sets from the machine state snapshots (act 406). The feature set includes feature set events identified in the state data or inferred or otherwise calculated from the machine state snapshots. For example, in one embodiment, the machine state snapshot contains scheduled tasks and the state data indicates which tasks are scheduled and when they are scheduled to be run. The correlation data structure generator engine 140 creates a feature set event of the scheduled task being run at the scheduled time and adds it to the feature set. In some embodiments, the correlation data structure generator engine 140 further identifies two machine state snapshots, the first machine state snapshot indicating that a task is scheduled to be run at a time before the second machine state snapshot. The second machine state snapshot no longer includes the scheduled task, indicating that it was run.

In some embodiments, feature set events include events associated with creating a new user account, detection of a newly detected user login attempt, running a process for a first time, installing new services, explicitly stopping a process, and adding, changing, or removing registry keys. In some embodiments, these feature set events occur on a monitored machine 165a or 165b. In some embodiments, these feature set events occur generally in the monitored network 160.

The correlation data structure generator engine 140 also builds a correlation data structure 122 to store the relationship correlations (act 408). As described above, in some embodiments, the correlation data structure 122 is built and stored in the computer-readable memory 120. In other embodiments, the correlation data structure is built and stored on a distributed system 155a or 155b. In some embodiments, building the data correlation structure 122 involves allocating memory for a matrix, table, or other structure capable of storing the relationship correlations between alert conditions, feature set events, and associated times of influence.

Finally, the correlation data structure generator engine 140 calculates and stores the relationship scores 220 (act 410). These relationship scores 220 reflect the relative correlation between each feature set event, alert condition, and associated time of influence. In some embodiments, calculating and storing the relationship scores 220 is assigning a fixed value to each relationship score 220. In some embodiments, the fixed value is different for each relationship score 220. In some embodiments, the relationship scores 220 are calculated from the feature set events, alert conditions, and associated times of influence observed in the monitored network 160. In yet other embodiments, the calculated relationship scores 220 are derived from empirical data. This empirical data may be from burn-time or test monitoring of the monitored network 160, a real or virtual network used to artificially simulate the operation of a monitored cloud network 160, or from historical or researched data compiled or derived from data compiled to provide accurate estimations of the appropriate correlation for each relationship score 220.

In some embodiments, the correlation data structure generator engine 140 iteratively performs the processes described above, to provide additional data for generating a more accurate correlation data structure 122. In other embodiments, this allows the correlation data structure generator engine 140 to generate additional correlation data structures 122. In yet still other embodiments, this is simply to allow the correlation data structure generator engine 140 to be monitoring signals at steps 402, 404, and 406 (in a loop) until being called upon to allocate resources for generating a new correlation data structure 122.

In some embodiments, the generation of the correlation data structure 122 makes use of the feature set events and alert conditions detected from monitoring only a subset of monitored machines. In other embodiments, the correlation data structure is generated in response to monitoring of all of the monitored machines 165a and 165b, which can help create a more accurate and/or universally applicable/complete correlation data structure 122.

Figure 5:
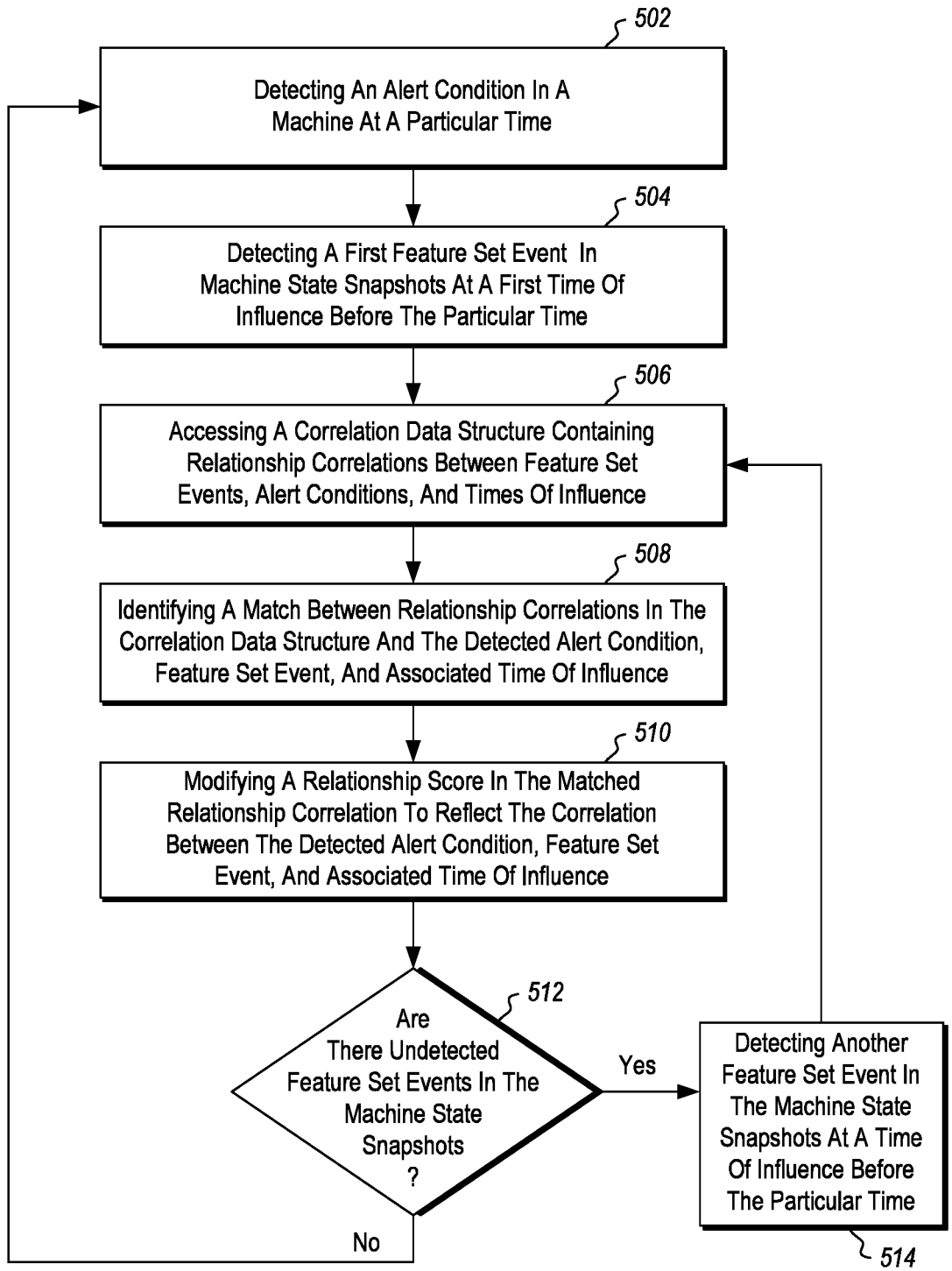
FIG. 5 illustrates a method for tuning a correlation data structure.

After or during the generation of the correlation data structure, the correlation data structure can be tuned and/or applied. FIG. 5 illustrates a flow chart of a method for tuning a correlation data structure 500. In some embodiments, the correlation data structure modification engine 142 modifies or otherwise tunes the correlation data structure by altering the relationship scores 220 of the data correlation structure 122 by increasing the score based on detecting a new match and/or by decrementing the score in response to determining the match is from an exceptionally noisy or less relevant machine/system.

Initially, an alert condition is detected in a monitored machine 165a or 165b at a particular time (act 502). The alert condition is detected, for instance, by the correlation data structure modification engine 142. In other embodiments, the alert condition is detected by the alert condition mitigation engine 144. In still other embodiments, the alert condition is detected by the monitoring system 100. In yet still other embodiments, the alert condition is detected by a system in the monitored network 160. In some embodiments, the system in the monitored network 160 is a security or network function of the monitored network 160. In other embodiments, the system is one of the monitored machines 165a or 165b. In some embodiments, the system is the monitored machine 165a or 165b on which the alert condition is detected.

After detecting the alert condition, the correlation data structure modification engine 142 examines machine state snapshots to detect one or more feature set event that occurred at a time of influence before the detected alert condition. The correlation data structure modification engine 142 selects one of the detected one or more feature set events that are determined to occur at a time of influence before an alert condition (act 504). In some embodiments, the correlation data structure modification engine 142 selects one of the detected feature set events at random. In other embodiments, the correlation data structure modification engine 142 selects a detected feature set event with particular characteristics. For instance, in some embodiments, these characteristics cause the correlation data structure modification engine 142 to select a detected feature set event known to be related to or correlated with the detected alert condition.

The correlation data structure modification engine 142 then accesses the correlation data structure 122 (act 506). The correlation data structure modification engine 142 uses the detected alert condition and detected feature set event with the associated time of influence determined from the machine state snapshot to form a signal pattern 300. This allows the correlation data structure modification engine 142 to identify the matching relationship correlation 360 and matching relationship score 365 for the signal pattern 300 that has been detected (act 508).

Based on the occurrence of the signal pattern 300, the correlation data structure modification engine 142 modifies the matching relationship score 365 to reflect an increased or decreased correlation between the detected alert condition and the detected feature set event at the associated time of influence (act 510).

In some embodiments, the correlation data structure modification engine 142 will increase correlations for detected signal patterns 300. In some embodiments, the increase will correspond to a fixed increment of the matching relationship score 365. In some embodiments, the fixed increment will be an integer amount (e.g., increase by a value of 1 or another value).

In some embodiments, when a detected signal pattern 300 has occurred, which corresponds with similar values in the correlation data structure, the correlation data structure modification engine 142 will increase the matching relationship score 365.

In some embodiments, the correlation data structure modification engine 142 will also detect feature set events that occurred in a first machine state snapshot at an earlier time that did not result in an alert condition for times between the earlier time and a later time when a second machine state snapshot was taken. The correlation data structure modification engine 142 will create a pair of the detected feature set event and an associated time of influence that is the difference between the earlier and later times. The correlation data structure modification engine 142 then identifies a row (or other data structure element) with a matching time of influence 356, as shown in FIG. 3 and described above. Each element of this row corresponds to a signal pattern 300 for a different alert condition. The correlation data structure modification engine 142 will decrease the matching relationship score 365 for each of these signal patterns 300.

In some embodiments, the correlation data structure modification engine 142 will decrease correlations for certain detected signal patterns 300, corresponding to a fixed decrement of the matching relationship score 365. In some embodiments, the fixed decrement will be an integer amount (e.g., by a value of 1 or another value). The decrement or increment of a score can be based on a weighting of particular machine signals, based on predetermined relevance values associated with different systems/machines/tenants. The different predetermined relevance values associated with different machines can be based on one or more relevant factors associated with the machines, such as a type or configuration of the machines, functionality of the machines, frequency of sampling the machines, location of machines, and/or any other factors.

In some embodiments, the correlation data structure modification engine 142 will also find a first machine state snapshot at a first time and second machine state snapshot at a second time have been taken and no alert conditions were detected between the first and second times. When this occurs, no signal patterns 300 have occurred relating feature set events detected in the first machine state snapshot and having a time of influence equal to the difference between the first and second times. This is true for every event in the row of matching time of influence 365. Since none of the detected signal patterns 300 occurred over this time of influence for the detected feature set event, there is an indication that such signal patterns 300 are less likely or less correlated. Given this, the correlation data structure modification engine 142 will decrease the matching relationship score 365.

In some embodiments, after modifying the relationship score (act 510), the correlation data structure modification engine 142 optionally checks if there are additional feature set events in the machine state snapshots that have not been selected or detected (act 512). If there are, another feature set event is detected or selected from the machine state snapshots (act 514) and the correlation data structure modification engine 142 continues the process from act 506. If there are no undetected or unselected feature set events in the machine state snapshots, the correlation data structure modification engine 142 returns to act 502 and waits for the next alert condition to be detected.

In some embodiments, the correlation data structure modification engine performs optional act 512 until there are no undetected or unselected feature set events in the machine state snapshots. In some embodiments, the correlation data structure modification engine 142 performs option act 512 a fixed number of times. In some embodiments, the correlation data structure modification engine 142 performs optional act 512 only on detected feature set events with particular characteristics. In some embodiments, the correlation data structure modification engine 142 performs optional act 512 until another requirement or condition is satisfied. In some embodiments, the condition is a new alert condition being detected.

In some embodiments, the tuning of the correlation data structure 122 by the method for tuning a correlation data structure 500 advantageously makes use of the alert conditions occurring in a plurality of the monitored machines 165a and 165b such that the tuned correlation data structure 122 reflects relationship correlations across the plurality of the monitored machines 165a and 165b in the monitored network 160. In some embodiments, the plurality of monitored machines 165a and 165b includes all (or only a subset) of the monitored machines 165a and 165b in the monitored network 160.

Figure 6:
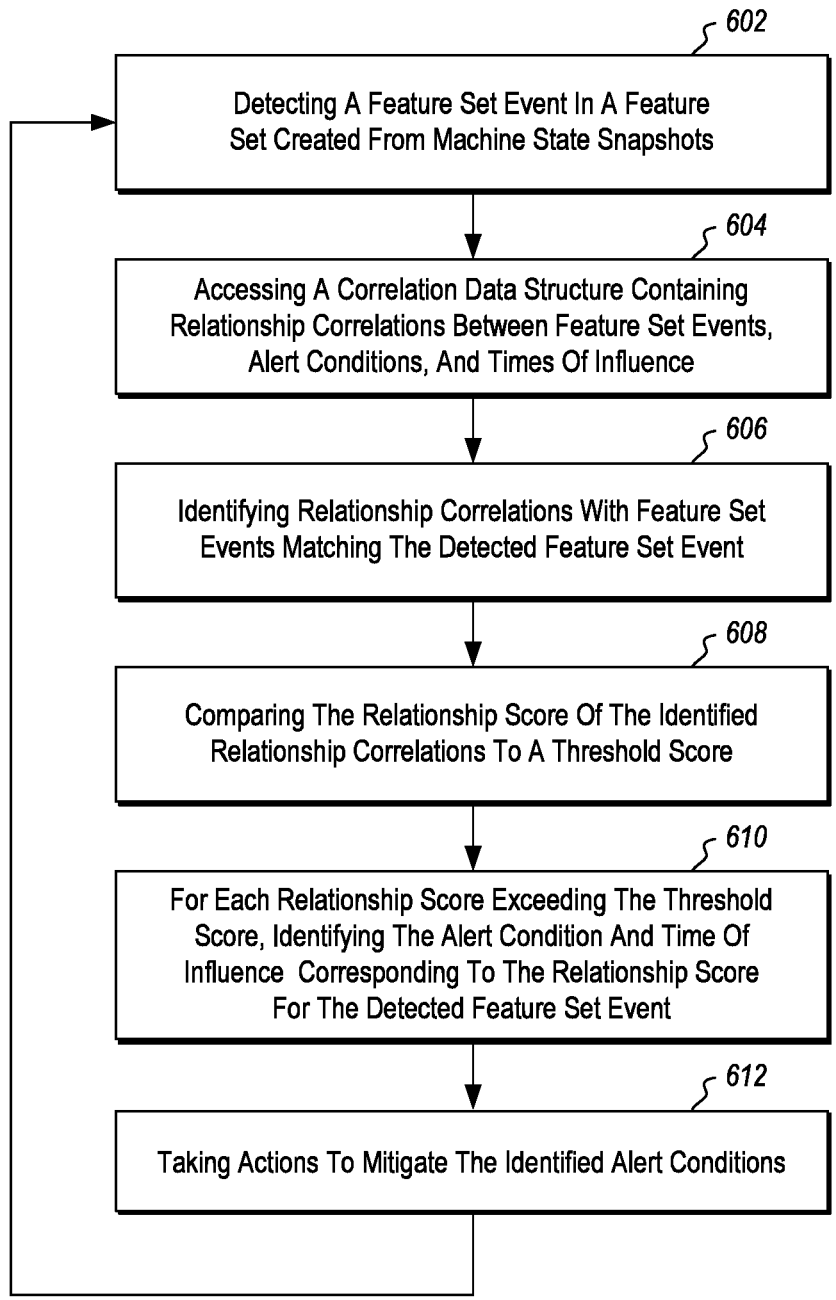
FIG. 6 illustrates a method for detecting and mitigating attacks on a cloud machine.

Attention will now be directed to FIG. 6, which illustrates a flow chart for a method for detecting and mitigating attacks on a machine 600. In some embodiments, this method 600 describes how the monitoring system 100 and the alert condition mitigation engine 144 mitigate alert conditions. In other embodiments, this method describes how the monitoring system 100 and the alert condition mitigation engine 144 detect and mitigate alert conditions. In some embodiments, this method is applied to data provided to the monitoring system 100 and the alert condition engine 144 offline.

Initially, the alert condition mitigation engine 144 analyzes feature sets created from machine state snapshots to detect feature set events (act 602). In some embodiments, more than one feature set event is detected. In some embodiments, the method for detecting and mitigating attacks on the machine 600 is applied to all the detected feature set events. In some embodiments, the method 600 is applied to a plurality of the detected feature set events in parallel. In some embodiments, a single feature set event is selected from the detected feature set events and the method 600 is performed.

After detecting the feature set events, the alert condition mitigation engine 144 accesses a correlation data structure 122 (act 604). Then, using the correlation data structure 122, the alert condition mitigation engine 144 identifies relationship correlations with feature set events matching the detected feature set event (act 606). This will be described with reference to FIG. 3.

As previously described in reference to FIG. 3, for a detected feature set event, the alert condition mitigation engine 144 'fixes' or otherwise determines the detected feature set event 320 to be the matching feature set event, yielding the matching feature set event section 350. The corresponding identified relationship correlations are all the relationship correlations in this matching feature set event section 350. In particular, each cell of the matching feature set event section 350 is a matching relationship correlation 360 corresponding to the detected feature set event 320 and some potentially detected alert condition 310 and associated time of influence 330 in a potential signal pattern 300. Each matching relationship correlation 360 also has a matching relationship score 365.

Returning to FIG. 6, the alert condition mitigation engine 144 compares the matching relationship score 365 for each cell in the matching feature set event section 350 to a threshold score (act 608). In some embodiments, the threshold score is a fixed value. In some embodiments, the threshold score is adjustable. In some embodiments, the threshold score varies based on the associated alert condition, time of influence, or feature set event. For example, a first alert condition that has serious consequences may have a relatively lower threshold score. A second alert condition that has limited or minimal consequences may have a relatively high threshold score.

For each matching relationship score 365 that breaks the threshold score, the alert condition mitigation engine 144 identifies the matching alert condition and time of influence that correspond to the matching relationship score 365. The matching alert condition and time of influence identify a detected alert condition 310 and associated time of influence 330 to form a signal pattern 300 (act 610).

In some embodiments, breaking the threshold score is exceeding the threshold score. In other embodiments, breaking the threshold score is meeting or exceeding the threshold score.

After identifying an alert condition, the alert condition mitigation engine 144 takes actions to mitigate the identified alert condition (act 612). In some embodiments, the identified alert condition is a detected alert condition 310 and the alert condition mitigation engine 144 detects it and triggers the correlation data structure modification engine 142 to perform the method for tuning a correlation data structure 500.

In some embodiments, the identified alert condition is identified before the actual alert condition has taken place and the action or mitigation that is triggered is an action to prevent the alert condition from occurring. For example, a first alert condition is identified with a first time of influence from the detected feature set event. The detected feature set event occurred recently enough that the first time of influence has not actually passed, so the first alert condition has not actually occurred yet. Due to this, the action taken by the alert condition mitigation engine 144 is to prevent or otherwise mitigate the impact of a possible future occurrence of the first alert condition.

In some embodiments, the action taken to mitigate the identified alert condition includes generating a notification including the identified alert condition, the detected feature set event, and the associated time of influence. In some embodiments, the notification includes recommendations for mitigating or resolving the first alert condition. In some embodiments, the contents of the notification are obfuscated to prevent disclosure of private user details.

In some embodiments, the action taken to mitigate the identified alert condition includes sending code to at least one monitored machine 165a or 165b that is executable by the machine(s) to prevent the first alert condition. In some embodiments, the code fixes, repairs, or otherwise resolves issues or damage caused by the identified alert condition on at least one monitored machine 165a or 165b.

In some embodiments, the action taken to mitigate the identified alert condition includes modifying settings on one or more monitored machines 165a or 165b. In some embodiments, the modified settings are security settings. In some embodiments, the action taken to mitigate the identified alert condition includes generating a notification including suggested modifications to settings on one or more monitored machines 165a or 165b.

In some embodiments, the action taken to mitigate the identified alert condition includes installing programs on at least one monitored machine 165a or 165b. In some embodiments, the action taken to mitigate the identified alert condition includes generating a notification recommending programs to be installed on at least one monitored machine 165a or 165b.

In some embodiments, the action taken to mitigate the identified alert condition is to compile a summary of information on the first condition and publish the summary. In some embodiments, the summary is published to at least one monitored machine 165a or 165b. In some embodiments, the summary is published to be generally available for users of a monitored network 160.

With regard to the foregoing notifications/publications, it is noted that the notifications/publications can be sent on a subscription only basis or proactively without requiring a subscription. Also, the notifications can be sent directly to monitored systems or indirectly through a third party system. Furthermore, to improve security and privacy (anonymity), in some instances, the information provided in the notifications/publications is redacted or obfuscated to remove user sensitive data. It should also be noted that the notifications/publications can include any incomplete or complete portion of the correlation data structure(s).

In some embodiments, after taking action to mitigate the identified alert conditions, the alert condition mitigation engine 144 may optionally continue to detect feature set events, iteratively implementing one or more portions of method 600.

In some embodiments, the tuning or modification of the correlation data structure 122 includes changes or modifications to the relationship scores 220 based on a first signal pattern 300 detected or identified in monitored machine 165a. Monitored machine 165b lacks any security solution for dealing with first signal pattern 300. However, using the method for detecting and mitigating attacks on a machine 600, the alert condition mitigation engine 144 can identify feature set events that are the detected feature set events 320 in the first signal pattern 300. When first signal pattern 300 has occurred enough that the matching relationship score 365 indicates a high correlation, the alert condition mitigation engine 144 can use method 600 to identify or detect the potential detected alert condition 310, allowing action to be taken to mitigate or eliminate the potential alert condition.

Such an embodiment advantageously allows the monitoring system 100 to provide security detections in monitored machines 165a and 165b that do not have security solutions in place. It further allows the entire monitored network 160 to improve coverage of security detections for each individual monitored machine 165a or 165b. Additionally, in some monitored networks 160, each monitored machine 165a and 165b may have different security solutions in place. Embodiments described above will allow those security solutions to provide data on alert conditions that would normally be unavailable to monitored machines 165a and 165b that lack those security systems.

In some embodiments, an alert condition may not be prevented or mitigated by an existing security solution installed on a monitored machine 165a or 165b. However, by utilizing the described methods, a monitoring system 100 can advantageously learn through the training of the correlation data structure 100 to detect and mitigate such alert conditions on one or more tenant machines 165a or 165b.

Figure 7:
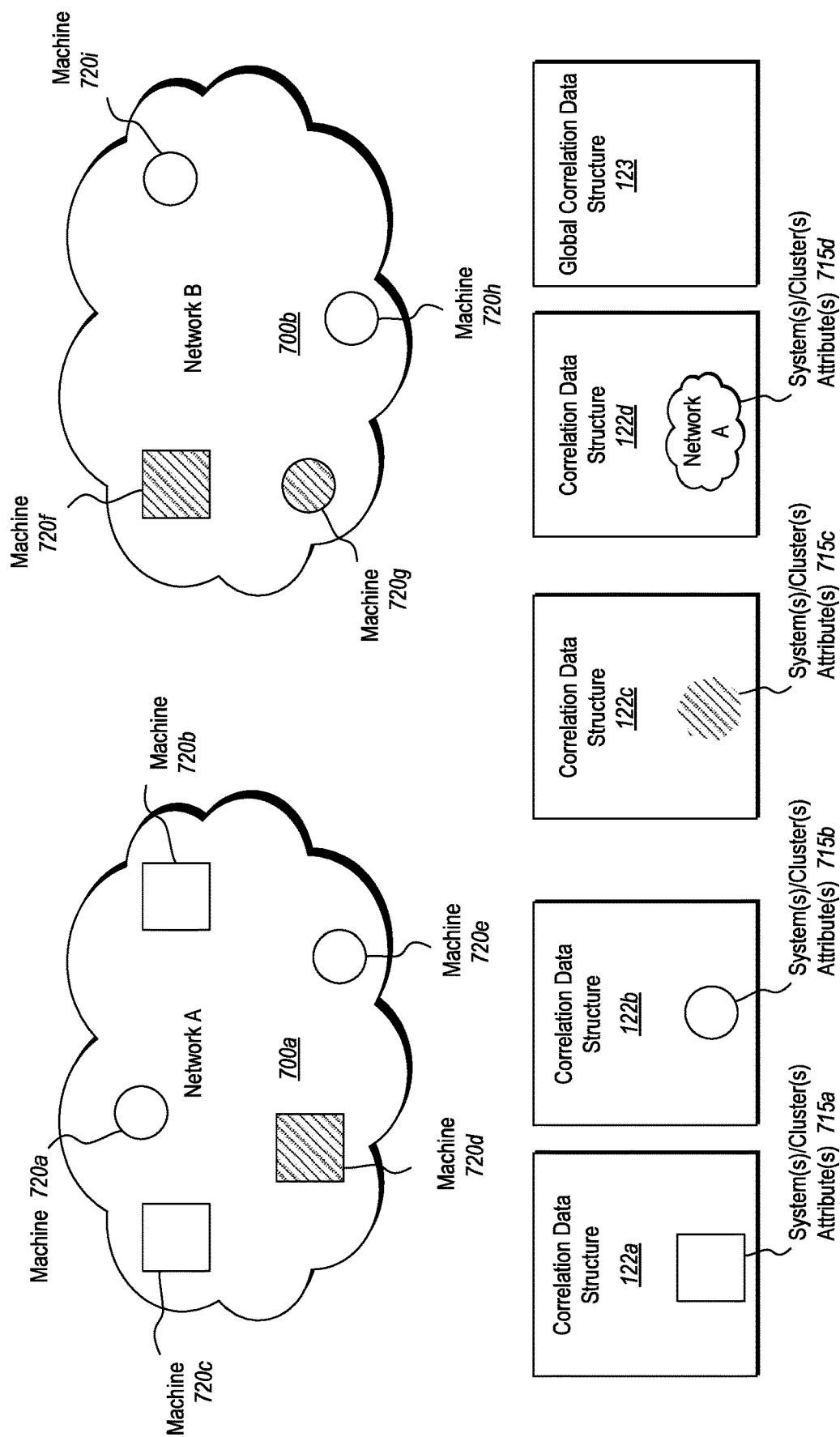
FIG. 7 illustrates cloud networks containing system(s) and cluster(s) and an embodiment for dividing correlation data structures to monitor attribute differences.

Attention will now be directed to FIG. 7, which illustrates networks and associated correlation data structures. One or more of the illustrated networks can comprise cloud networks, on-premise networks and/or hybrid networks that include a combination of cloud network systems and on-premise network systems.

In some embodiments, the correlation data structure 122 actually represents a plurality of different correlation data structures, as mentioned above (e.g. correlation data structures 122a, 122b, 122c, and 122d). Each of the correlation data structures 122a, 122b, 122c, and 122d has associated system(s)/cluster(s) attribute(s) 715a, 715b, 715c, and 715d, respectively, but they are grouped into separate correlation data structures based on the scope of machines they correspond to. Because the correlation data structures 122a, 122b, 122c, and 122d represent subsets of the machines, clusters, clouds, or systems in the monitored network 160, they are sometimes referred to as regional, cluster or local correlation data structures.

As an example, correlation data structure 122a has associated system(s)/cluster(s) attribute(s) 715a. The attribute is pictorially indicated with a shape as an example, in this case a square, and identifies attributes of a system or cluster in the monitored network 160.

By way of example, the monitored network 160 includes network A 700a and network B 700b. Systems or clusters containing attributes of both networks may exist in one or both of network A 700*a* and network B 700*b*.

Example system or cluster attributes include, but are not limited to, a specific machine, system, or cluster; a specific machine type, work scope, location, user type, user industry type, number of users per machine, system or cluster; number of machines in a system or cluster, user enterprise type, a specific company; or other attributes.

Some systems or clusters include more than one attribute. In the embodiment shown in FIG. 7, the systems or clusters are machines 720*a*, 720*b*, 720*c*, 720*d*, 720*e*, 720*f*, 720*g*, 720*h*, and 720*i*. Machines 720*b*, 720*c*, 720*d*, and 720*f* all include attribute 715*a*. Machines 720*d* and 720*f* also include attribute 715*c*, as does machine 720*g*. Machine 720*g* includes attribute 715*b*, along with machines 720*a*, 720*e*, 720*h*, and 720*i*. Additionally, attribute 715*d* is all systems, clusters, or machines in network A, as indicated by the symbol and labeled network. This includes machines 720*a*, 720*b*, 720*c*, 720*d*, and 720*e*.

In some embodiments, correlation data structures are global, as in global correlation data structure 123, and represent all machines, systems, or clusters in a monitored network 160.

In some embodiments, only a global correlation data structure 123 is used. In other embodiments, multiple correlation data structures are used, as depicted in FIG. 7. In some embodiments, only regional or local correlation data structures are used. In some embodiments, the correlation data structure used may not represent all machines, systems, or clusters in the monitored network 160. For example, in some embodiments, only correlation data structure 122*a* with system(s)/cluster(s) attribute(s) 715*a* is used. As such, the data correlation structure for the monitored network 160 in this example will not represent all machines 165*a* and 165*b* in the monitored network 160.

In some embodiments, the method for generating a correlation data structure 400, the method for tuning a correlation data structure 500, and/or the method for detecting and mitigating attacks 600 are applied to or used with each of the correlation data structures 122*a*, 122*b*, 122*c*, 122*d*, and 123, separately (sequentially or in parallel). In some embodiments, the methods 400, 500, and 600 are applied to or used on only a subset of the correlation data structures 122*a*, 122*b*, 122*c*, 122*d*, and 123. In some embodiments, the methods 400, 500, and 600 are applied to or used on all of the correlation data structures 122*a*, 122*b*, 122*c*, 122*d*, and 123.

In some embodiments, the monitored network 160 includes noisy machines. Noisy machines are operating in modes or manners which generate more alerts than are normally expected. In some embodiments, the higher alert generation is artificial. This can bias the correlations in the correlation data structure 122. In some embodiments, noisy machines receive their own correlation data structure and are monitored separate from other machines.

In some embodiments, when modifying the relationship scores 220 using the method for tuning a correlation data structure 500, the amount of modification in act 510 is weighted to reduce the impact of noisy machines on the correlation data structure.

In some embodiments, the monitoring system 100 is configured to detect or identify noisy machines in the monitored network. In some embodiments, the monitoring system 100 further is configured to exclude noisy machines from the method for generating a correlation data structure 400, the method for tuning a correlation data structure 500, and the method for detecting and mitigating attacks 600.

Figure 8:
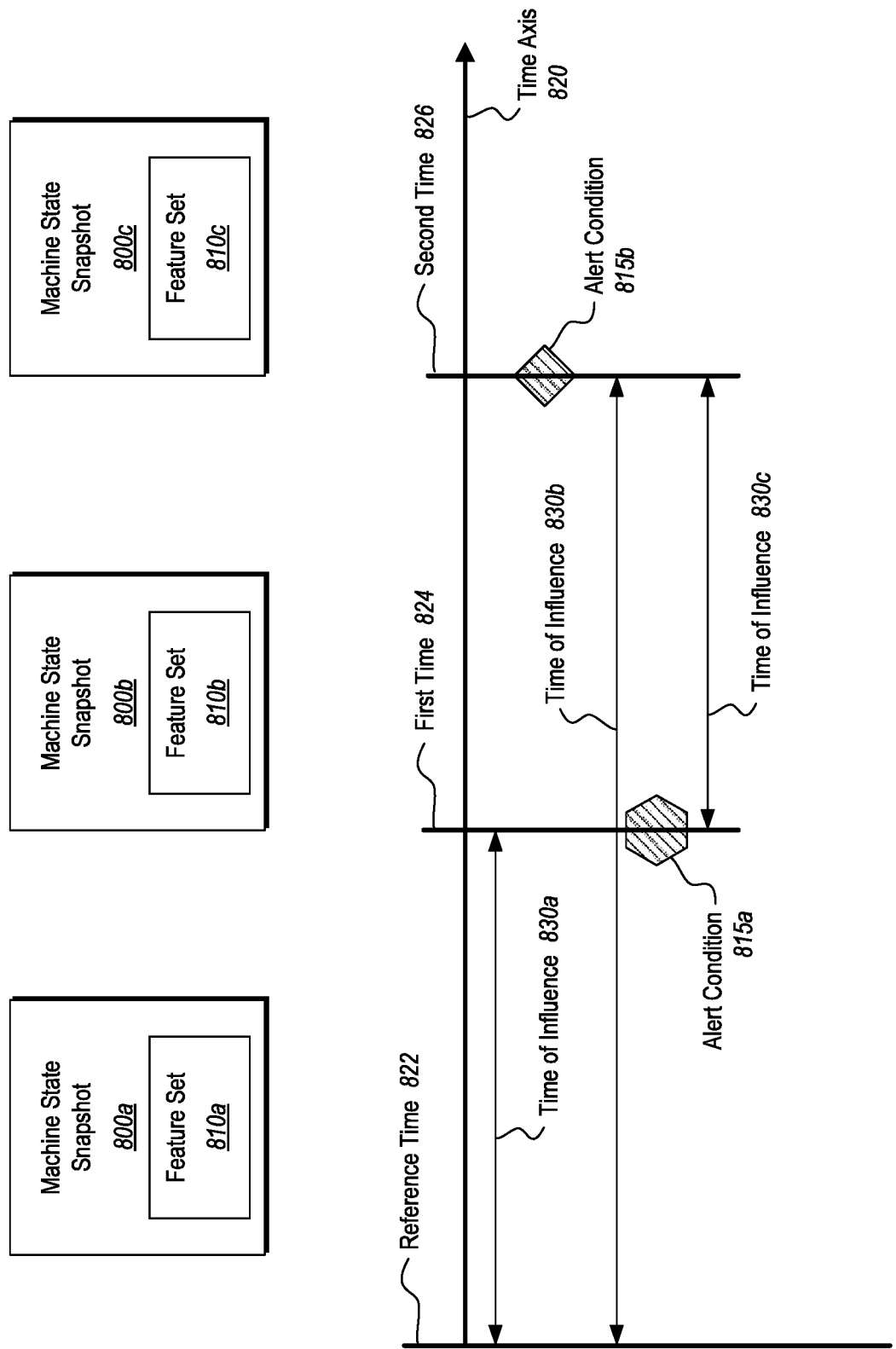
FIG. 8 illustrates how alert conditions and feature set events relate to time of influence.

FIG. 8 illustrates how times of influence 830*a*, 830*b*, and 830*c* may be calculated from feature set events in feature sets 810*a*, 810*b*, and 810*c* and alert conditions 815*a* and 815*b*. This figure is provided as a graphical representation of how times of influence may be determined for feature set events in a feature set with respect to alert conditions.

A time axis 820 is shown starting from a reference time 822, where machine state snapshot 800*a* was taken. First time 824 indicates when machine state snapshot 800*b* was taken and also happens to indicate when alert condition 815*a* occurred. Second time 826 indicates when machine state snapshot 800*c* was taken and also when alert condition 815*b* occurred. In some embodiments, alert conditions do not occur at the same time as machine state snapshots. Feature sets 810*a*, 810*b*, and 810*c* were created from machine state snapshots 800*a*, 800*b*, and 800*c*, respectively.

As an example, for any feature set event found in feature set 810*a*, the time of influence associated with that feature set event and alert condition 815*a* is indicated by time of influence 830*a* and is the difference in time between the reference time 822 and the first time 824. With regards to alert condition 815*b*, the time of influence to feature set events in feature set 810*a* is time of influence 830*b*, the difference between reference time 822 and the second time 826. For feature set events in feature set 810*b*, the time of influence associated with alert condition 815*a* is zero, as the feature set events were captured simultaneously with the alert condition 815*a*. This is also true for feature set events in feature set 810*c* and alert condition 815*b*. For feature set events in feature set 810*b*, the time of influence to alert condition 815*b* is time of influence 830*c*, the difference between the first time 824 and the second time 826.

Figure 9:
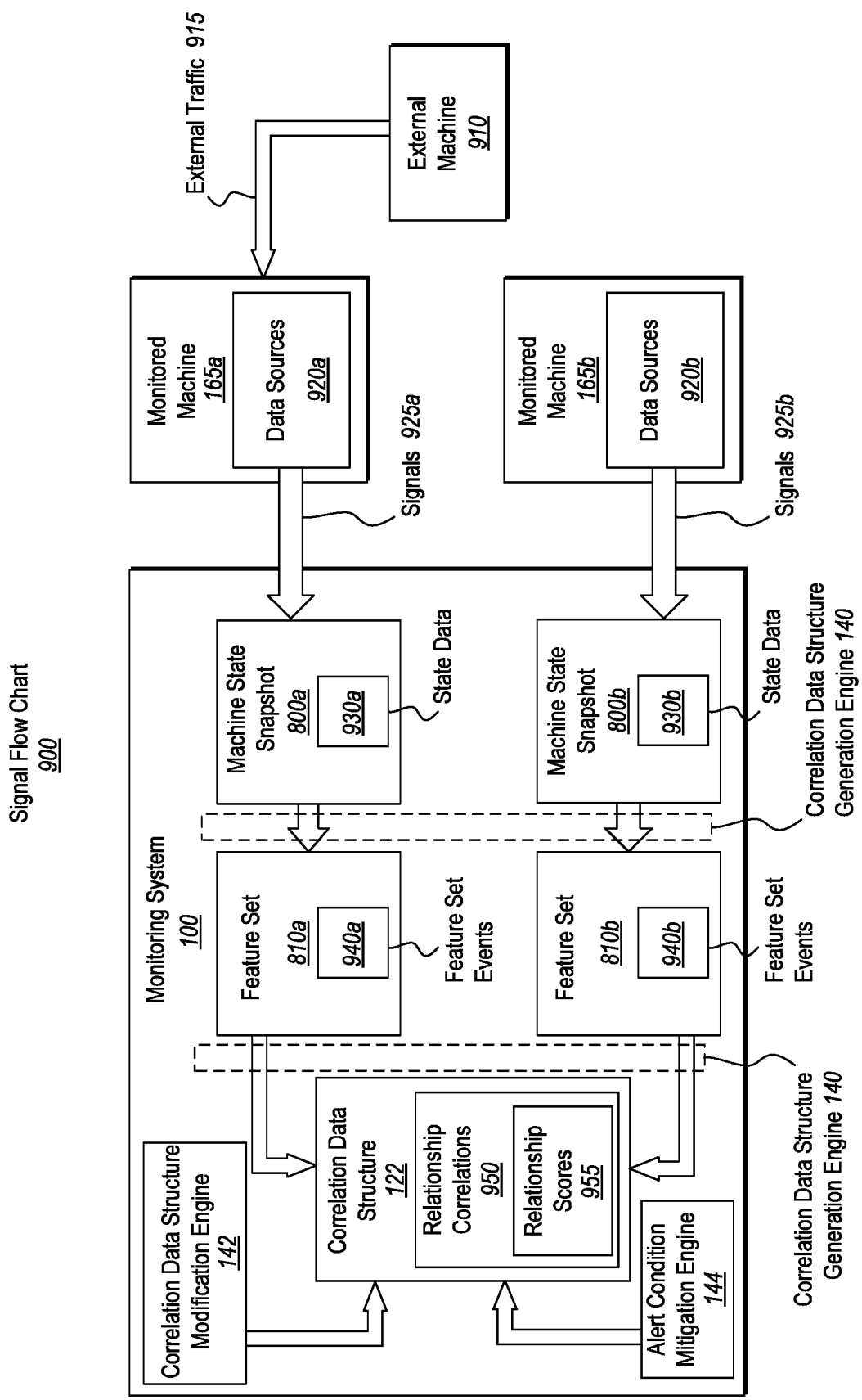
FIG. 9 illustrates a block diagram flowchart of how information moves through the monitoring system.

FIG. 9 illustrates a signal flow chart 900 depicting the flow of data in the monitoring system 100 as a correlation data structure 122 is generated. Monitored machines 165*a* and 165*b* shown are part of the monitored network 160, as depicted in FIG. 1. An external machine 910 is in communication with monitored machine 165*a* through external traffic 915. External machine 910 is not part of the monitored network 160. External traffic 915 may be an attack or threat directly by external machine 910. Alternatively, external traffic 910 may be legitimate or authorized communication with monitored machine 165*a*. In some cases, external machine 910 may have been infected with a virus, malware, or other malicious code that piggy backs on an otherwise legitimate or authorized communication in external traffic 910.

Monitored machines 165*a* and 165*b* generate signals 925*a* and 925*b* from data sources 920*a* and 920*b*. The signals 925*a* and 925*b*, as described in above embodiments, can indicate the occurrence of feature set events within each monitored machine 165*a* and 165*b* or within monitored network 160. In some embodiments, the signals 925*a* and 925*b* contain information regarding normal operation of monitored machines 165*a* and 165*b*, including interaction with external traffic 915. In some embodiments, signals 925*a* and 925*b* contain data regarding specific feature set events of interest. In some embodiments, signals 925*a* include data regarding feature set events caused by external traffic 915.

Monitoring system 100, as disclosed above, reads signals 925*a* and 925*b* and creates machine state snapshots 800*a* and 800*b* representing the state data 930*a* and 930*b* for monitored machines 165*a* and 165*b*, respectively. This state data 930*a* and 930*b* includes the relevant data from the signals 925*a* and 925*b*, respectively, to identify feature set events that occurred in monitored machines 165*a* and 165*b*.

Correlation data structure generation engine 140, depicted with the hashed-line box, takes the machine state snapshots 800a and 800b and creates, as described above, corresponding feature sets 810a and 810b, each containing feature set events 940a and 940b, respectively. Then correlation data structure engine 140 uses the feature sets 810a and 810b to generate the correlation data structure 122. As described above, this includes generating the relationship correlations 950 and the relationship scores 955.

Correlation data structure modification engine 142 and alert condition mitigation engine 144 also have access the correlation data structure 122, as described in more detail above.

As described throughout this disclosure, various embodiments have been described. It will be appreciated that the scope of this disclosure and the claims includes embodiments that include any combination of the aspects described herein. It will also be appreciated that the foregoing embodiments can be used to efficiently build, tune and apply correlation data structures that define correlations between signal patterns and security alerts and to, thereby, help to help detect and mitigate alert conditions. The disclosed embodiments can also help to reduce the computational processing that would otherwise be expended and required to address security breaches and malware infections associated with the alert conditions.

The present invention may be embodied in other specific forms without departing from its spirit or characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A computer-implemented method for managing a correlation data structure to detect and mitigate attacks on a machine, the method comprising:

for a first machine in a plurality of machines, detecting a first feature set event in a feature set from one or more machine state snapshots, the one or more machine state snapshots including state data associated with one or more signals associated with one or more sources available to the first machine, the feature set including one or more feature set events identified in the state data;

accessing a correlation data structure that includes a plurality of relationship correlations that reflect relationships between a plurality of feature set events detected on one or more machines of the plurality of machines and a plurality of alert conditions detected on the one or more machines of the plurality of machines, the plurality of alert conditions representing a detection of one or more attacks on the one or more machines of the plurality of machines, wherein each relationship correlation of the plurality of relationship correlations (1) reflects a relationship between a separate feature set event of the plurality of feature set events and a separate corresponding alert condition of the plurality of alert conditions and (2) is based at least in part on a time of influence associated with the separate feature set event from the plurality of feature set events and the separate corresponding alert condition from the plurality of alert conditions, wherein for any particular relationship correlation of the plurality of relationship correlations the time of influence indicates a difference in time between a detection of the separate feature set event on one or more machines of the plurality of machines and a detection of the separate corresponding alert condition on one or more machines of the plurality of machines, the correlation data structure also including a predetermined relationship score for each relationship correlation that reflects a relative value for each relationship correlation in the correlation data structure;

identifying a first relationship correlation from the plurality of relationship correlations and a first predetermined relationship score associated with the first relationship correlation, the first relationship correlation corresponding to the first feature set event, a first alert condition from the plurality of alert conditions, and a first time of influence associated with correlating the first feature set event and the first alert condition;

determining whether the first predetermined relationship score meets or exceeds a predetermined threshold score; and upon determining the first predetermined relationship score meets or exceeds the predetermined threshold score, taking one or more actions to mitigate the first alert condition.

2. The method of claim 1, further comprising generating a notification including the first feature set event, the first alert condition, and the first time of influence.

3. The method of claim 2, wherein the notification further includes one or more recommendations for resolving the first alert condition.

4. The method of claim 2, wherein information in the notification is obfuscated to prevent disclosure of private user details of one or more users of the plurality of machines.

5. The method of claim 1, wherein the one or more actions taken to mitigate the first alert condition comprises sending code to at least one machine from the plurality of machines, the code being operable to prevent the first alert condition.

6. The method of claim 1, wherein the one or more actions taken to mitigate the first alert condition comprises modifying one or more settings in at least one machine of the plurality of machines.

7. The method of claim 1, wherein the one or more actions taken to mitigate the first alert condition comprises installing one or more programs in at least one machine of the plurality of machines.

8. The method of claim 1, wherein the one or more actions taken to mitigate the first alert condition comprises sending code to repair damage from the first alert condition on at least one machine of the plurality of machines.

9. The method of claim 1, wherein managing a correlation data structure to detect and mitigate attacks in a network is performed offline.

10. The method of claim 1, wherein the one or more actions taken to mitigate the first alert condition comprises:
compiling a summary of information on the first alert condition;
obfuscating user sensitive data in the summary to ensure anonymity of users; and
publishing the summary to at least one machine of the plurality of machines.

11. The method of claim 1, further comprising:
detecting, in at least one machine of the plurality of machines, a presence of a second feature set event and a second alert condition, the second feature set event and the second alert condition corresponding to a second relationship correlation of the correlation data structure, the second relationship correlation being based at least in part on a second time of influence associated with the second feature set event and the second alert condition; and in response to detecting the presence of the second feature set event and the second alert condition associated with the second time of influence, increasing a second relationship score associated with the second relationship correlation.

* * * * *